United States Patent Office 2,888,425
Patented May 26, 1959

2,888,425

CERTAIN POLYEPOXIDE MODIFIED OXYALKYLATION DERIVATIVES, SAID DERIVATIVES OBTAINED IN TURN BY OXYALKYLATION OF PHENOL-ALDEHYDE RESINS

Melvin De Groote, St. Louis, Kwan-ting Shen, Brentwood, and Jen-pu Cheng, University City, Mo., assignors to Petrolite Corporation, Wilmington, Del., a corporation of Delaware No Drawing. Original application March 9, 1954, Serial No. 415,180. Divided and this application January 24, 1957, Serial No. 635,983

5 Claims. (Cl. 260—43)

This application is a division of our copending application Serial No. 415,180, filed March 9, 1954, now abandoned.

Our invention is concerned with new chemical products or compounds useful as demulsifying agents in processes or procedures particularly adapted for preventing, breaking or resolving emulsions of the water-in-oil type and particularly petroleum emulsions. Our invention is also concerned with the application of such chemical products or compounds in various other arts and industries as well as with methods of manufacturing the new chemical products or compounds which are of outstanding value in demulsification.

Certain valuable products are obtained by modification of oxyalkylated phenol-aldehyde resins by means of polyepoxides and particularly diepoxides. For instance, as an example of this type reference is made to co-pending application of De Groote and Shen, Serial No. 349,972, dated April 20, 1953, now U.S. Patent 2,792,353, dated May 14, 1957. Said co-pending application relates to a process for breaking petroleum emulsions of the water-in-oil type characterized by subjecting the emulsion to the action of a demulsifier including synthetic hydrophile products which are the reaction products of certain alkyl phenol-aldehyde resins, therein described in detail, and certain non-aryl polyepoxides, also therein described in detail.

The present invention is analogous to the invention of said aforementioned co-pending application, Serial No. 349,972, filed April 20, 1953, except that the polyepoxides employed are characterized by being hydrophobe in character although free from any radical having 5 or more uninterrupted carbon atoms in a single group.

These new polyepoxides and particularly diepoxides along with a method for making the same, are described in our co-pending application, Serial No. 415,178, filed March 9, 1954, now U.S. Patent 2,854,461.

The present invention then is concerned essentially with the modification of the oxyalkylation derivatives of solvent-soluble phenol-aldehyde resins of the kind hereinafter described by means of polyepoxides and particularly diepoxides of the kind described in our co-pending application, Serial No. 415,178, filed March 9, 1954. The initial oxyalkylation is obtained by means of monoepoxides having not over four carbon atoms.

Briefly stated, the polyepoxides of the kind herein employed and described in our aforementioned co-pending application, Serial No. 415,178, are characterized by a polyepoxide of the structure

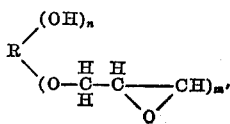

in which $n$ is small whole number not over 4 and including 0, and $m'$ is a small whole number varying from 2 to 4, and R is the residual radical of the intermediate polyol

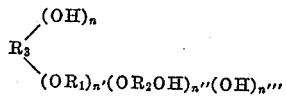

in which $n$ is a small whole number varying from 0 to 4, $OR_1$ represents oxyethylene radicals, oxypropylene radicals, and oxybutylene radicals, $OR_2OH$ represents oxy(hydroxy)propylene radicals and oxy(hydroxy)butylene radicals; $n'$ is a numeral varying from 2 to 200; $n''$ and $n'''$ is each a numeral varying from 0 to 8; with the proviso that the radical $R_3$ be free from any radical having at least 5 uninterrupted carbon atoms and consist essentially of a polyoxyalkylene chain containing sufficient alkylene groups having 3 and 4 carbon atoms to impart water insolubility and hydrophobe solvent solubility to the initial precursory polyol $R_3(OH)_{n_4}$ in which $n_4$ is a small whole number varying from 2 to 4.

As far as the use of the herein described products goes for the purpose of resolving petroleum emulsions of the water-in-oil type, and also for that matter for numerous other purposes where surface-active materials are effective, and particularly for those uses specified elsewhere herein, we prefer to employ oxyalkylated derivatives, which are obtained by the use of mono-epoxides, in such manner that the derivatives so obtained have sufficient hydrophile character to meet at least the test set forth in U.S. Patent No. 2,499,368, dated March 7, 1950, to De Groote, et al. In said patent such test for emulsification using a water-insoluble solvent, generally xylene, is described as an index of surface activity.

In the present instance the various oxyalkylated derivatives obtained particularly by use of ethylene oxide, propylene oxide, etc., may not necessarily be xylene-soluble although they are xylene-soluble in a large number of instances. If such compounds are not xylene-soluble the obvious chemical equivalent, or equivalent chemical test, can be made by simply using some suitable solvent, preferably a water-soluble solvent such as ethylene glycol diethylether, or a low molal alcohol, or a mixture to dissolve the appropriate product being examined and then mix with the equal weight of xylene followed by addition of water. Such test obviously is the same for the reason that there will be two phases on vigorous shaking and surface activity makes its presence manifest. It is understood the reference in the hereto appended claims as to the use of xylene in the emulsification test includes such obvious variant.

Reference is made to U.S. Patent No. 2,499,368 dated March 7, 1950, to De Groote and Keiser. Attention is directed to that part of the text which appears in columns 28 and 29, lines 12 through 75, and lines 1 through 21, respectively. Reference is made to this test with the same force and effect as if it were here included. This, in essence, means that the preferred product for resolution of petroleum emulsions of the water-in-oil type is characterized by the fact that a fifty-fifty solution in xylene, or its equivalent, when mixed with one to three volumes of water and shaken will produce an emulsion.

Another peculiarity of the compounds herein described is that they may pass into a comparatively high molecular weight range and be effective for various purposes, not only for the resolution of petroleum emulsions but also for other industrial uses described in detail elsewhere. This characteristic may be related to the fact that the initial resin molecule, obtained in turn from two resin molecules combined by means of a polyepoxide as described results in a fairly large molecule.

As previously pointed out, we have found that we can obtain effective compounds for the herein described purposes where surface-active materials are employed, whether it be for the resolution of petroleum emulsions or other uses, in which the oxyalkylated derivatives subjected to reaction with a polyepoxide may represent roughly two parts of the initial resin and 98% of the alkylene oxide. The word, "oxyalkylated," is employed in this sense for the purpose of convenience in referring to the monoepoxide derivative only.

For purpose of convenience, what is said hereinafter will be divided into seven parts:

Part 1 is concerned with general descriptive matter particularly pointed out where the herein employed polyepoxides and particularly diepoxides are inherently different from those previously employed in somewhat analogous procedures;

Part 2 is concerned with the preparation of the particular polyepoxides herein employed and it is to be noted that this part, and the preceding part, are substantially as they appear in our co-pending application, Serial No. 415,178, filed March 9, 1954.

Part 3 is concerned with suitable phenolaldehyde resins to be employed after oxyalkylation for reaction with the epoxides.

Part 4 is concerned with the oxyalkylation of the previously described phenol-aldehyde resins;

Part 5 is concerned with reactions involving the two preceding types of materials and examples obtained by such reaction. Generally speaking, this involves nothing more than a reaction between two moles of a previously prepared oxyalkylated phenol-aldehyde resin as described and one mole of a polyepoxide so as to yield a new and larger oxyalkylated resin molecule;

Part 6 is concerned with the resolution of petroleum emulsions of the water-in-oil type by means of the previously described chemical compounds or reaction products; and Part 7 is concerned with uses for the products herein described, either as such or after modification, including uses in applications other than those involving resolution of petroleum emulsions of the water-in-oil type.

PART 1

For sake of simplicity reference will be made largely to diepoxides for the reason that such compounds are the preferred class and the most important class of the present invention. This is true also in light of ease of comparison with other available diepoxides.

At present there are available two types of diepoxides, one being a diepoxide in which there is present at least one or more hydrophobe radicals characterized by the presence of at least 5 uninterrupted carbon atoms. These materials are widely used for a variety of purposes and particularly in the preparation of epoxy resins. They are sold by at least one or more companies and are readily available in the open market. Reference is made to U.S. Patent 2,792,355, dated May 14, 1957, to De Groote et al. for a description of hydrophobe and hydrophile type diepoxides.

Of the two types of diepoxides the hydrophile type may be used as a reactant for producing diepoxides or polyepoxides of the kind which characterize the instant invention. For this reason there is a brief but fairly complete description of this type of diepoxide.

The hydrophile type of polyepoxide and particularly diepoxide is characterized by the freedom from any radical having at least 5 uninterrupted carbon atoms. If for convenience one characterized the hydrophobe type as the aryl type then the hydrophile type of polyepoxides, and particularly diepoxides, may be referred to as non-aryl. Such products have been described in a number of patents. More specifically, such patents are the following: Italian Patent No. 400,973, dated August 8, 1941; British Patent No. 518,057, dated December 10, 1938; U.S. Patent No. 2,070,990, dated February 16, 1937 to Gross et al.; and U.S. Patent No. 2,581,464, dated January 8, 1952, to Zech.

Of the two types of diepoxides described above, the hydrophile type may be used as a reactant for producing the diepoxides or polyepoxides useful in the present invention. In addition, a polyalkylene glycol can be employed as the initial reactant in forming the useful polyepoxides.

It is well known that there are certain polyalkylene glycols which are water-insoluble notwithstanding the fact that there is not present a hydrophobe radical having at least 8 uninterrupted carbon atoms. This does not apply to polyethylene glycols. Polyethylene glycols are water-soluble even when the undiluted material represents a hard wax-like product. This does not apply to low molal polypropylene glycols and low molal polybutylene glycols. For instance, there are available in the open market polypropylene glycols of the formula $HOCH_2(CHCH_3OCH_2)_nCHCH_3OH$ in which $n$ is 2 to 34. Polypropylene glycols having a molecular weight of approximately 150 to 425 are water-soluble. Those of molecular weight ranging from 1,000 or thereabouts to 2,000 or above, are substantially water-insoluble and will show solubility in a hydrocarbon solvent such as xylene, kerosene, or the like. An example is a polypropylene glycol having a molecular weight of approximately 600 or modestly above. The same applies to polybutylene glycol although in this instance there is some variation depending on the particular isomeric oxide from which the glycol was obtained. It goes without saying that everything else being equal the polybutylene glycols show water insolubility and oil solubility in a slightly lower molecular weight than the polypropylene glycols. It is also obvious one can obtain mixed glycols by the use of both propylene oxide and butylene oxide which will show properties somewhere between the two, depending again, at least in part, on the particular butylene oxide employed. Also it is obvious, although ethylene oxide in itself cannot be employed as a source of polyalkylene glycols it can be used in admixture provided such use does not overcome the solubility factor, i.e., does not render them water-soluble, or for some purpose does not materially decrease the solubility in a hydrocarbon solvent, such as xylene or the like. Indeed, in some instances there is a distinct advantage in reacting a small amount of ethylene oxide with a glycol which has been obtained from a higher oxide, or equivalent, i.e., propylene oxide butylene oxide or a mixture. The reason is that reaction of the terminal radicals with the ethylene oxide insures the presence of a primary hydroxyl radical.

The simplest polyol suitable for the present purpose is a diol or glycol. Such glycols are obtained hypothetically by reacting a mole of water with butylene oxide, propylene oxide or ethylene oxide so as to obtain a product which has the solubility characteristics of the kind herein described. To a lesesr degree glycide or methylglycide may be used although the limitations are obvious. Instead of starting with water one may, of course, start with any suitable reactant of the kind described or may start with a simple glycol such as ethylene glycol, butylene glycol, or propylene glycol. Actually, there are available in the open market a variety of glycols particularly polypropylene glycols or mixtures containing some ethoxy radicals which vary from approximately 600 molecular weight to perhaps as high as 7500. Such materials have been converted into ethers and used for various purposes including the resolution of petroleum emulsions. See, for example, U.S. Patent No. 2,662,859, dated December 15, 1953, to Kirkpatrick. The diols therein employed as reactants may be employed also as reactants in the present invention provided only that they meet the required solubility characteristics. Such raw materials in said U.S. Patent 2,662,859 are described as polyoxyalkylene diols wherein the major proportion of the molecular weight is attributable to oxypropylene groups (e.g., oxy 1,2-propylene) or to mixed oxyethylene and oxypropylene groups in which the weight ratio of oxyethylene to oxypropylene does not exceed 4:1. Where the oxyalkylene groups consist of oxyethylene and oxypropylene groups, the minimum molecular weight should be at least 1350 and preferably at least 2000. The best results have been obtained where the oxyalkylene groups consist of 50% to 100% by weight of oxypropylene groups. With the foregoing limitations the molecular weights of the compounds employed for the purpose of the invention are preferably within the range of 1500 to 7500.

Thus the initial reactant may be considered as a diol (obtained perhaps by reaction of an alkylene oxide and water) or any one of the other compounds described elsewhere and may be indicated by the formula $R(OH)_n$, in which R is free from any radical having more than 4 uninterrupted carbon atoms in a single group and $n$ is a numeral from 2 to 4. If such compound is then reacted with propylene oxide or butylene oxide or a mixture, or a combination of propylene oxide and ethylene oxide, or butylene oxide and ethylene oxide, the product of oxyalkylation may be indicated thus:

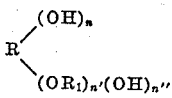

in which $OR_1$ is selected from the class of oxyethylene radicals, oxypropylene radicals, and oxybutylene radicals with the proviso that $n$ represents a numeral from 0 to 2, and $n''$ a numeral from 2 to 4, with the proviso that the sum of $n$ and $n''$ is not over 4; and with the further proviso that $n'$ is a numeral varying from 10 to 200; with the added proviso that at least part of the occurrences of $OR_1$ be selected from the class of oxypropylene, and oxybutylene radicals so that the polyol is water-insoluble and hydrocarbon soluble.

Bearing in mind that one might employ glycide or methyl glycide to a limited degree in the same way that ethylene oxide can be used to a limited degree, it is apparent that the previous formula can be rewritten thus:

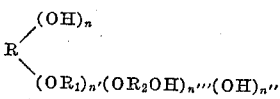

in which all the various characters have their previously mentioned significance with the proviso that $OR_2OH$ is the divalent radical corresponding to a member of the class selected from glycide, or methyl glycide, and $n'''$ is a comparatively small whole number less than 10, including 0.

In any event, having obtained a suitable glycol of the kind above described, such glycol is reacted with epichlorohydrin, or the equivalent, to yield corresponding compounds in which the terminal radical appears:

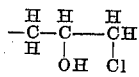

If for convenience this terminal radical is indicated by the symbol $R_2$ then it becomes obvious the two previous formulas, assuming all the hydroxyl groups are converted into the chlorine-containing derivatives may be indicated as follows:

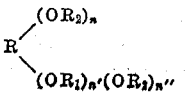 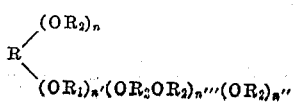

However, there is no need necessarily to convert all the hydroxyl groups provided that at least 2 are converted, i. e., that one obtains a derivative in which there are at least two groups of the radical $OR_2$. This may be indicated thus:

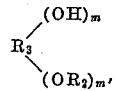

in which $R_3$ is the appropriate polyol residue or, more correctly, the appropriate oxyalkylated polyol residue, in which $m$ is a small whole number not over 4 and including 0, and $m'$ is a small whole number varying from 2 to 4.

The dehydrochlorination of course yields a corresponding polyepoxide which may or may not have free hydroxyls and may be indicated thus:

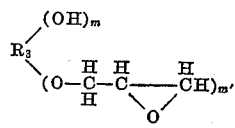

in which $m$ and $m'$ have their previous significance and $R_3$ is the residual radical of the oxyalkylated polyol

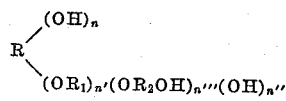

It has been pointed out previously that the present invention is not limited to diepoxides but includes polyepoxides particularly triepoxides and tetraepoxides. For instance, previous reference has been made to the treatment of certain products with ethylene oxide as a terminal reactant. The resultants of such reactants are still diols. However, if instead of using a mole of ethylene oxide one employs a mole of glycide the resultant product is a triol. Similarly, if 2 moles of glycide, or for that matter methylglycide, are employed, the resultant product would be a tetrahydroxylated compound. Such polyhydroxylated compounds can be reacted with epichlorohydrin or the like to yield polyepoxides.

As another illustration one may start with glycerol and react propylene oxide or butylene oxide, or a mixture, and obtain a water-insoluble triol, usually having a molecular weight of 600 or higher. Such material can be treated with 3 moles of epichlorohydrin to yield polyepoxides.

Similarly, water soluble tetra-hydroxylated products such such as pentaerythritol or acyclic diglycerol can be reacted with propylene oxide or butylene oxide or a mixture to yield a water-insoluble tetrahydroxylated compound. Such product in turn may be reacted with epichlorohydrin to yield a polyepoxide. For a number of reasons the most desirable compound is obtained from a diol and the second most desirable class appears to be obtained from triols, such as glycerol, 1,1,1-tris(hydroxymethyl)ethane, etc.

Also, it is obvious that if one starts with a polyol having more than 2 hydroxyls then polyepoxide can be obtained in which there is at least one or possibly more residual hydroxyl radicals. Thus, oxypropylated glycerol can be reacted with 2 moles of epichlorohydrin yielding a substantial amount of a compound in which there are present 2 epichlorohydrin groups and one hydroxyl group. As to oxyalkylated glycerol see U.S. Patent No. 2,665,-312, dated January 5, 1954, to Ohlmann et al. Similarly acyclic diglycerol will yield a comparable product having 2 or 3 epoxide radicals and 2 or one residual hydroxyl radicals. The main difficulty in the preparation of this type of compound is the tendency toward self-polymerization characteristic of comparable compounds such as glycide or methylglycide.

Previous reference has been made to the fact that the hydrophile type of polyepoxide and particularly diepoxide will be used to prepare a suitable polyol and particularly a diol which becomes the initial reactant in the present manufacturing procedure. This, however, requires explanation for the reason that obviously a water-insoluble diol or the equivalent, for instance, polypropyleneglycol having a molecular weight of approximately 600 or 700, could be reacted in a molal ratio of two moles of the glycol with one mole of a diepoxide as previously described, for instance,

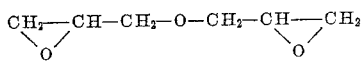

to yield a suitable tetraol which then could be reacted with epichlorohydrin. Similarly, one might use a polybutyleneglycol having a molecular weight of about 600 or a mixed glycol which had been prepared by the use of both butylene oxide and propylene oxide. Indeed, in either instance the glycol could be reacted with a small amount of ethylene oxide provided, of course, that the reaction product after combination with a hydrophile diepoxide still met the solubility requirements noted elsewhere in the text.

Where reference has been made to the use of ethylene oxide, butylene oxide, or propylene oxide, and particularly the latter, certain glycidyl ethers could be substituted such as allylglycidyl ether, isopropyl glycidyl ether, ethylene glycidyl ether, or the like.

PART 2

In addition to the other polyols which have been described as suitable reactants, attention is directed to the specific description of certain suitable polyols which appear in U.S. Patents Nos. 2,626,903, 2,626,904 and 2,626,905, all dated January 27, 1953, to De Groote, and 2,652,421; 2,652,422 and 2,652,424, all dated September 15, 1953, to De Groote.

Any desired procedure may be employed in the preparation of the present polyepoxides and particularly diepoxides. As far as the reaction with epichlorohydrin is concerned it is our preference to use boron trifluoride as a catalyst.

In the dehydrochlorination it is our preference to use either caustic soda in powder or pellet form, or in any suitable form, or to use sodium aluminate. To the extent that a solvent is required it is our preference to use isopropyl ether or dioxane as a solvent. As to patents which show these various steps but not in the preparation of diepoxides of the kind herein described, see U.S. Patents Nos. 1,446,872, dated February 27, 1923; 2,061,377, dated November 17, 1936; 2,070,990, dated February 16, 1937; 2,224,849, dated December 17, 1940; 2,248,635, dated July 8, 1941; 2,314,039, dated March 16, 1943; 2,351,025, dated June 13, 1944; and 2,538,072, dated January 16, 1951.

Any suitable procedure can be employed in the reaction involving epichlorohydrin and the selected polyol particularly a diol. Due to ready availability and low cost we prefer to use polypropyleneglycols as the reactants. Furthermore, in the use of a diol there is less opportunity for complicating reactants than when triols or tetrahydroxy compounds are used.

The following examples illustrate the condensation procedure:

Example 1a 3,000 grams of polypropylene glycol 1200 (2.5 moles) were mixed with 30 cc. of a 10% solution of boron fluoride in ether. This represented about 2 or 3 grams of boron fluoride. The temperature was raised to about 80° C. and held at this temperature within 3° in either direction. About 7½ moles of epichlorohydrin (699 grams) were added over a period of 4 or 5 hours. At the end of this time the reaction appeared to be complete.

Immediately following is Table I which shows in tabular form a number of other condensations conducted in the same manner as described above.

TABLE I

| Ex. No. | Polyhydroxylated compound | Grams | Moles | Epichlorohydrin | | 10% BF$_3$ solution, cc. | Temp., ° C. | Time, hrs. |
|---|---|---|---|---|---|---|---|---|
| | | | | Grams | Moles | | | |
| 1a | Polypropylene glycol 1200 | 3,000 | 2.5 | 699 | 7.5 | 30 | 80 | 5 |
| 2a | Polypropylene glycol 400 | 600 | 1.5 | 419 | 4.5 | 9 | 80 | 3 |
| 3a | Polypropylene glycol 750 | 750 | 1.0 | 279 | 3.0 | 9 | 80 | 4 |
| 4a | Polypropylene glycol 1000 | 500 | 0.5 | 140 | 1.5 | 5 | 80 | 4 |
| 5a | Polypropylene glycol 2000 | 400 | 0.2 | 56 | 0.6 | 4 | 80 | 4 |
| 6a | Tributylene glycol | 552 | 2.0 | 556 | 6 | 10 | 85 | 4 |
| 7a | Tetrabutylene glycol | 362 | 1.0 | 279 | 3 | 5 | 85 | 4 |
| 8a | Pentabutylene glycol | 448 | 1.0 | 279 | 3 | 6 | 85 | 4 |
| 9a | Hexabutylene glycol | 534 | 1.0 | 279 | 3 | 6 | 85 | 5 |
| 10a | Heptabutylene glycol | 620 | 1.0 | 279 | 3 | 7 | 85 | 5 |
| 11a | Dimethyl tetrabutylene glycol | 306 | 1.0 | 279 | 3 | 5 | 80 | 4 |

It is to be noted that the amount of epichlorohydrin employed is greater than mole-for-mole based on the hydroxyl present in the polyhydroxylated compound. We have found this necessary to obtain a suitable yield. Thus, it well may be, and probably is true, that the number of chlorine atoms in the intermediate product is greater than one-to-one based on the hydroxyl radical. Also, it is true that in the course of dehalogenation some epichlorohydrin may be converted into a hydroxylated compound or derivative.

Having obtained the epichlorohydrin derivatives as described above the intermediate product is subjected to dehalogenation. A number of procedures can be employed and the following illustrations will serve.

Example 1b

In this procedure the sodium aluminate method was used. Epichlorohydrin derivative Example 1a was employed as the intermediate. 1130 grams of this material were mixed with 530 grams of technical sodium aluminate, along with 111 grams of water and 1800 grams of dioxane. The mixture was stirred at room temperature for about a half hour and then heated under reflux condenser for 10 hours. The mixture refluxed at approximately 95° C. At the end of this time the reaction mass was filtered and the filter residue washed with dioxane. The filtrate was then subjected to vacuum stripping so as to remove the solvent by use of a temperature of 150° C. under 30 mm. pressure.

The epoxide value determination on the stripped residue showed approximately 2 epoxide radicals per mole i.e., the value being 1.87 in one instance and 1.90 in the other.

The yield was 1019 or slightly over 93% based on the initial diol.

*Example 2b*

A similar experiment was repeated, using slightly small quantities, to wit, 200 grams of Intermediate Example 1b, 95 grams of sodium aluminate, 20 grams of water and 300 grams of dioxane. The amount of product obtained was 180 grams (again a 93% yield) and the epoxide value was substantially the same as before.

*Example 3b*

In this procedure the caustic soda method was employed instead of using sodium aluminate. 200 grams of condensate Example 2a were mixed with 600 grams of isopropyl ether and 21 grams of caustic soda. The mixture was stirred and the temperature held at 30° C., plus or minus 5, for seven hours. The caustic soda in flake form was added in 4 portions. 40% of the caustic soda was added during the first hour, 30% during the second hour, 20% was added during the third hour, and 10% in the fourth hour. After the final addition of caustic soda the mixture was then stirred for 4 hours longer. The mixture was allowed to settle for approximately 3 days, decanted, washed with 100 grams of isopropyl ether and then filtered over 50 cc. (volume measurement) of diatomaceous earth.

The ratio of epoxide radicals per molecule were the same as in previous examples and the yield was approximately the same.

Using the same procedure, or obvious variants, a number of other intermediates were prepared which appear in Table II and are identified as Examples 1b through 13b. Note that where the solvent is designed with an (A) or (B), the (A) indicates the solvent was dioxane, and the (B) shows the solvent was isopropyl ether.

In regard to the above procedure, reference is made to the following patents which are concerned with boron fluoride as a catalyst; or dehydrochlorination procedure employing either sodium aluminate or caustic soda; and also in one instance a patent is concerned with the use of dioxane as a solvent:

| U. S. Patent No. | Date |
|---|---|
| 1,446,872 | Feb. 27, 1923 |
| 2,061,377 | Nov. 17, 1936 |
| 2,070,990 | Feb. 16, 1937 |
| 2,224,849 | Dec. 17, 1940 |
| 2,248,635 | July 8, 1941 |
| 2,314,039 | Mar. 16, 1943 |
| 2,351,025 | June 13, 1944 |
| 2,538,072 | Jan. 16, 1951 |

The products derived in the manner above described, i.e., the polyepoxides and particularly the diepoxides, are generally light colored or sometimes straw or amber colored. The amount used in most instances is so small that this color is not objectionable. If required, however, the products could be bleached by use of filtering clays, charcoal, or the like.

PART 3

This part is concerned with the preparation of phenol-aldehyde resins of the kind described in detail in U.S. Patent No. 2,499,370, dated March 7, 1950, to De Groote and Keiser, with the following qualifications: said aforementioned patent is limited to resins obtained from difunctional phenols having 4 to 12 carbon atoms in the substituent hydrocarbon radical. For the present purpose the substituent may have as many as 18 carbon atoms, as in the case of resins prepared from tetradecylphenol, substantially para-tetradecylphenol, commercially available. Similarly, resins can be prepared from hexadecylphenol or octadecylphenol. This feature will be referred to subsequently.

In addition to U.S. Patent No. 2,499,370, reference is made also to the following U.S. Patents: Nos. 2,499,365; 2,499,366; and 2,499,367, all dated March 7, 1950, to De Groote and Keiser. These patents, along with the other two previously mentioned patents, describe phenolic resins of the kind herein employed as initial materials.

For practical purposes, the resins having 4 to 12 carbon atoms are most satisfactory, with the additional $C_{14}$ carbon atom also being very satisfactory. The increased cost of the $C_{16}$ and $C_{18}$ carbon atom phenol renders these raw materials of less importance, at least at the present time.

TABLE II

| Ex. No. | Epichlorohydrin derivatives of Ex. No. | Grams | Dehalogenation reagent | | | Temp., °C. | Time, hrs. | Solvents, grams | Yield, percent |
|---|---|---|---|---|---|---|---|---|---|
| | | | NaOH, Grams | NaAlO₂, Grams | H₂O, Grams | | | | |
| 1b | 1a | 1,130 |  | 530 | 111 | 93-95 | 10 | 1,800 (A) | 93 |
| 2b | 1a | 300 |  | 95 | 20 | 93-95 | 10 | 300 (A) | 93 |
| 3b | 1a | 200 | 21 |  |  | 30-35 | 7 | 600 (B) | 93 |
| 4b | 2a | 339 | 79 |  |  | 30-35 | 6 | 1,000 (B) | 90 |
| 5b | 3a | 480 |  | 322 | 68 | 93-95 | 6 | 720 (A) | 92 |
| 6b | 4a | 557 |  | 300 | 63 | 93-95 | 10 | 770 (A) | 93 |
| 7b | 5a | 400 |  | 121 | 25 | 93-95 | 10 | 550 (A) | 92 |
| 8b | 6a | 370 | 105 |  |  | 30-35 | 6 | 1,100 (B) | 91 |
| 9b | 7a | 300 | 74 |  |  | 30-35 | 6 | 900 (B) | 89 |
| 10b | 8a | 460 | 100 |  |  | 30-35 | 7 | 1,400 (B) | 88 |
| 11b | 9a | 272 | 53 |  |  | 30-35 | 7 | 800 (B) | 90 |
| 12b | 10a | 450 |  | 345 | 72 | 93-95 | 9 | 620 (A) | 91 |
| 13b | 11a | 585 | 158 |  |  | 30-35 | 6 | 1,700 (B) | 89 |

Patent 2,499,370 describes in detail methods of preparing resins useful as intermediates for preparing the products of the present application, and reference is made to that patent for such detailed description and to Examples 1a through 103a of that patent for examples of suitable resins.

As previously noted, the hydrocarbon substituent in the phenol may have as many as 18 carbon atoms, as illustrated by tetradecylphenol, hexadecylphenol and octadecylphenol, reference in each instance being to the difunctional phenol, such as the ortho- or para-substituted phenol or a mixture of the same. Such resins are described also in issued patents, for instance, U.S. Patent No. 2,499,365, dated March 7, 1950, to De Groote and Keiser, such as Example 71a.

It is sometimes desirable to present the resins herein employed in an over-simplified form which has appeared from time to time in the literature, and particularly in the patent literature, for instance, it has been stated that the composition is approximated in an idealized form by the formula

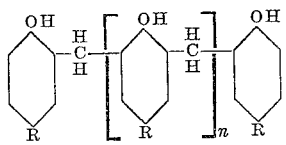

in the above formula $n$ represents a small whole number varying from 1 to 6, 7 or 8, or more, up to probably 10 or 12 units, particularly when the resin is subjected to heating under a vacuum as described in the literature. A limited sub-genus is in the instance of low molecular weight polymers where the total number of phenol nuclei varies from 3 to 6, i.e., $n$ varies from 1 to 4; R represents an aliphatic hydrocarbon substituent, generally an alkyl radical having from 4 to 14 carbon atoms, such as butyl, amyl, hexyl, decyl or dodecyl radical. Where the divalent bridge radical is shown as being derived from formaldehyde, it may, for course, be derived from any other reactive aldehyde having 8 carbon atoms or less.

In the above formula the aldehyde employed in the resin manufacture is formaldehyde. Actually, some other aldehyde such as acetaldehyde, propionaldehyde, or butyraldehyde may be used.

As previously stated, the preparation of resins, the kind herein employed as reactants, is well known. See U.S. Patent No. 2,499,368, dated March 7, 1950, to De Groote and Keiser. Resins can be made using an acid catalyst or basic catalyst or a catalyst showing neither acid nor basic properties in the ordinary sense or without any catalyst at all. It is preferable that the resins employed be substantially neutral. In other words, if prepared by using a strong acid as a catalyst, such strong acid should be neutralized. Similarly, if a strong base is used as a catalyst it is preferable that the base be neutralized although we have found that sometimes the reaction described proceeded more rapidly in the presence of a small amount of a free base. The amount may be as small as a 200th of a percent and as much as a few 100ths of a percent. Sometimes moderate increase in caustic soda and caustic potash may be used. However, the most desirable procedure in practically every case is to have the resin neutral.

In preparing resins one does not get a single polymer, i.e., one having just 3 units, or just 4 units, or just 5 units, or just 6 units, etc. It is usually a mixture; for instance, one approximating 4 phenolic nuclei will have some trimer and pentamer present. Thus, the molecular weight may be such that it corresponds to a fractional value for $n$ as for example, 3.5; 4.5; or 5.2.

In the actual manufacture of the resins we found no reason for using other than those which are lowest in price and most readily available commercially. For purpose of convenience suitable resins are characterized in the following table:

TABLE III

| Example number | R | Position of R | R''' derived from | n | Mol. wt. of resin molecule (based on n+2) |
|---|---|---|---|---|---|
| 1a | Phenyl | Para | Formaldehyde | 3.5 | 992.5 |
| 2a | Tertiary butyl | do | do | 3.5 | 882.5 |
| 3a | Secondary butyl | Ortho | do | 3.5 | 882.5 |
| 4a | Cyclohexyl | Para | do | 3.5 | 1,025.5 |
| 5a | Tertiary amyl | do | do | 3.5 | 959.5 |
| 6a | Mixed secondary and tertiary amyl | Ortho | do | 3.5 | 805.5 |
| 7a | Propyl | Para | do | 3.5 | 805.5 |
| 8a | Tertiary hexyl | do | do | 3.5 | 1,036.5 |
| 9a | Octyl | do | do | 3.5 | 1,190.5 |
| 10a | Nonyl | do | do | 3.5 | 1,267.5 |
| 11a | Decyl | do | do | 3.5 | 1,344.5 |
| 12a | Dodecyl | do | do | 3.5 | 1,498.5 |
| 13a | Tertiary butyl | do | Acetaldehyde | 3.5 | 945.5 |
| 14a | Tertiary amyl | do | do | 3.5 | 1,022.5 |
| 15a | Nonyl | do | do | 3.5 | 1,330.5 |
| 16a | Tertiary butyl | do | Butyraldehyde | 3.5 | 1,071.5 |
| 17a | Tertiary amyl | do | do | 3.5 | 1,148.5 |
| 18a | Nonyl | do | do | 3.5 | 1,456.5 |
| 19a | Tertiary butyl | do | Propionaldehyde | 3.5 | 1,008.5 |
| 20a | Tertiary amyl | do | do | 3.5 | 1,085.5 |
| 21a | Nonyl | do | do | 3.5 | 1,393.5 |
| 22a | Tertiary butyl | do | Formaldehyde | 4.2 | 996.6 |
| 23a | Tertiary amyl | do | do | 4.2 | 1,083.4 |
| 24a | Nonyl | do | do | 4.2 | 1,430.6 |
| 25a | Tertiary butyl | do | do | 4.8 | 1,094.4 |
| 26a | Tertiary amyl | do | do | 4.8 | 1,189.6 |
| 27a | Nonyl | do | do | 4.8 | 1,570.4 |
| 28a | Tertiary amyl | do | do | 1.5 | 604.0 |
| 29a | Cyclohexyl | do | do | 1.5 | 646.0 |
| 30a | Hexyl | do | do | 1.5 | 653.0 |
| 31a | do | do | Acetaldehyde | 1.5 | 688.0 |
| 32a | Octyl | do | do | 1.5 | 786.0 |
| 33a | Nonyl | do | do | 1.5 | 835.0 |
| 34a | Octyl | do | Butyraldehyde | 2.0 | 986.0 |
| 35a | Nonyl | do | do | 2.0 | 1,028.0 |
| 36a | Amyl | do | do | 2.0 | 860.0 |
| 37a | Butyl | do | Formaldehyde | 2.0 | 636.0 |
| 38a | Amyl | do | do | 2.0 | 692.0 |
| 39a | Hexyl | do | do | 2.0 | 748.0 |
| 40a | Cyclohexyl | do | do | 2.0 | 740.0 |

PART 4

There have been issued a substantial number of patents which give detailed description of the preparation of oxyalkylated derivatives of resins of the kind previously described. For example, see U.S. Patents 2,499,365; 2,499,366; 2,499,367; 2,499,368; and 2,499,370, all dated March 7, 1950, to De Groote and Keiser.

More specifically, a number of other patents have appeared in which the oxyethylation step is given with considerable detail. See, for example, U.S. Patents 2,581,376; 2,581,377; 2,581,378; 2,581,379; 2,581,380; and 2,581,381, all dated January 8, 1952, to De Groote and Keiser. As to further examples, see U.S. Patent 2,602,052, dated July 1, 1952 to De Groote.

The oxypropylation or, for that matter, the treatment of resins with butylene oxide, glycide, or methyl glycide, has been described in the first of the series in the above mentioned patents, i.e., those issued in 1950.

Reference is made to U.S. Patent 2,557,081, dated June 19, 1951, to De Groote and Keiser. This particular patent describes in considerable detail resins which are first treated with propylene oxide and then with ethylene oxide or with ethylene oxide and then propylene oxide or with both oxides simultaneously.

In order to avoid an extensive repetition of what is already described in detail in the patent literature, we are referring to the tables beginning in column 21 of U.S. Patent 2,581,376 and extending through column 36. We have simply numbered these products beginning with 1b, allotting, of course, five numbers to each table beginning with the first table. For convenience these sixteen tables are summarized in the following table:

TABLE IV

| Ex. No. | Phenol | Aldehyde | Solvent, lbs. | Resin, lbs. | Ethylene oxide, lbs. |
|---|---|---|---|---|---|
| 1bb | Para-tertiary amyl | Formaldehyde | 14.25 | 15.75 | 4.00 |
| 2bb | ----do---- | ----do---- | 10.90 | 12.10 | 15.25 |
| 3bb | ----do---- | ----do---- | 7.13 | 7.93 | 19.69 |
| 4bb | ----do---- | ----do---- | 3.84 | 4.25 | 16.15 |
| 5bb | ----do---- | ----do---- | 1.80 | 2.04 | 10.20 |
| 6bb | Nonyl | ----do---- | 15.00 | 15.00 | 3.00 |
| 7bb | ----do---- | ----do---- | 10.00 | 10.00 | 9.40 |
| 8bb | ----do---- | ----do---- | 7.27 | 7.27 | 13.70 |
| 9bb | ----do---- | ----do---- | 3.15 | 3.15 | 8.95 |
| 10bb | ----do---- | ----do---- | 2.10 | 2.10 | 8.00 |
| 11bb | Para-octyl | ----do---- | 14.20 | 15.80 | 3.25 |
| 12bb | ----do---- | ----do---- | 11.10 | 12.40 | 12.50 |
| 13bb | ----do---- | ----do---- | 6.64 | 7.36 | 15.00 |
| 14bb | ----do---- | ----do---- | 4.40 | 4.90 | 14.80 |
| 15bb | ----do---- | ----do---- | 4.10 | 4.58 | 18.52 |
| 16bb | Menthyl | ----do---- | 13.65 | 16.35 | 3.00 |
| 17bb | ----do---- | ----do---- | 10.00 | 12.00 | 10.75 |
| 18bb | ----do---- | ----do---- | 5.48 | 6.58 | 10.85 |
| 19bb | ----do---- | ----do---- | 4.10 | 4.90 | 13.15 |
| 20bb | ----do---- | ----do---- | 3.10 | 3.72 | 13.43 |
| 21bb | Para-secondary butyl | ----do---- | 14.45 | 15.55 | 4.25 |
| 22bb | ----do---- | ----do---- | 8.48 | 9.17 | 16.00 |
| 23bb | ----do---- | ----do---- | 4.82 | 5.18 | 14.25 |
| 24bb | ----do---- | ----do---- | 3.85 | 4.15 | 17.00 |
| 25bb | ----do---- | ----do---- | 2.65 | 2.85 | 15.45 |
| 26bb | Menthyl | Propionaldehyde | 12.80 | 17.20 | 2.75 |
| 27bb | ----do---- | ----do---- | 8.55 | 11.50 | 9.30 |
| 28bb | ----do---- | ----do---- | 3.77 | 5.08 | 13.10 |
| 29bb | ----do---- | ----do---- | 5.20 | 7.00 | 17.00 |
| 30bb | ----do---- | ----do---- | 2.10 | 2.83 | 9.12 |
| 31bb | Para-tertiary amyl | Furfural | 11.20 | 18.00 | 3.50 |
| 32bb | ----do---- | ----do---- | 8.45 | 13.60 | 12.65 |
| 33bb | ----do---- | ----do---- | 4.50 | 8.00 | 14.50 |
| 34bb | ----do---- | ----do---- | 3.42 | 5.48 | 15.10 |
| 35bb | ----do---- | ----do---- | 2.05 | 3.65 | 13.35 |
| 36bb | Menthyl | ----do---- | 10.25 | 17.75 | 2.50 |
| 37bb | ----do---- | ----do---- | 7.60 | 13.15 | 9.35 |
| 38bb | ----do---- | ----do---- | 4.22 | 6.98 | 10.00 |
| 39bb | ----do---- | ----do---- | 3.76 | 6.24 | 13.25 |
| 40bb | ----do---- | ----do---- | 2.40 | 4.15 | 11.70 |
| 41bb | Para-octyl | ----do---- | 12.10 | 18.60 | 3.00 |
| 42bb | ----do---- | ----do---- | 9.25 | 14.25 | 11.00 |
| 43bb | ----do---- | ----do---- | 6.72 | 10.32 | 14.91 |
| 44bb | ----do---- | ----do---- | 5.52 | 8.52 | 19.81 |
| 45bb | ----do---- | ----do---- | 1.75 | 2.70 | 8.40 |
| 46bb | Para-phenyl | ----do---- | 13.90 | 16.70 | 3.00 |
| 47bb | ----do---- | ----do---- | 10.35 | 12.45 | 12.20 |
| 48bb | ----do---- | ----do---- | 8.90 | 10.70 | 19.00 |
| 49bb | ----do---- | ----do---- | 5.20 | 6.26 | 16.64 |
| 50bb | ----do---- | ----do---- | 3.60 | 4.32 | 15.68 |
| 51bb | Para-secondary nonyl | ----do---- | 10.85 | 20.75 | 3.00 |
| 52bb | ----do---- | ----do---- | 8.28 | 15.85 | 11.77 |
| 53bb | ----do---- | ----do---- | 5.95 | 11.25 | 16.75 |
| 54bb | ----do---- | ----do---- | 4.46 | 8.52 | 19.07 |
| 55bb | ----do---- | ----do---- | 2.57 | 4.93 | 14.50 |
| 56bb | | | | | |
| 57bb | Para-phenyl | Formaldehyde | 11.00 | 9.00 | 11.75 |
| 58bb | | | | | |
| 59bb | | | | | |
| 60bb | Para-phenyl | | 3.41 | 2.80 | 13.64 |
| 61bb | Para-secondary butyl | Furfural | 12.00 | 17.90 | 3.50 |
| 62bb | ----do---- | ----do---- | 9.35 | 13.92 | 13.23 |
| 63bb | ----do---- | ----do---- | 6.25 | 8.95 | 17.00 |
| 64bb | ----do---- | ----do---- | 4.35 | 6.50 | 18.40 |
| 65bb | ----do---- | ----do---- | 3.02 | 4.34 | 16.49 |
| 66bb | Para-octyl | Propionaldehyde | 13.30 | 16.90 | 3.00 |
| 67bb | ----do---- | ----do---- | 10.20 | 12.90 | 11.30 |
| 68bb | ----do---- | ----do---- | 6.46 | 8.24 | 16.50 |
| 69bb | ----do---- | ----do---- | 3.86 | 4.87 | 13.02 |
| 70bb | ----do---- | ----do---- | 2.94 | 3.75 | 13.26 |
| 71bb | Para-nonyl | ----do---- | 10.90 | 18.00 | 3.00 |
| 72bb | ----do---- | ----do---- | 8.25 | 13.60 | 11.50 |
| 73bb | ----do---- | ----do---- | 5.65 | 9.35 | 15.75 |
| 74bb | ----do---- | ----do---- | 3.15 | 5.25 | 13.45 |
| 75bb | ----do---- | ----do---- | 1.94 | 3.21 | 10.65 |
| 76bb | Para-tertiary amyl | ----do---- | 12.60 | 16.20 | 8.50 |
| 77bb | ----do---- | ----do---- | 9.52 | 12.24 | 12.89 |
| 78bb | ----do---- | ----do---- | 6.50 | 8.30 | 17.75 |
| 79bb | ----do---- | ----do---- | 4.25 | 5.45 | 17.25 |
| 80bb | ----do---- | ----do---- | 2.69 | 3.43 | 14.55 |

Note.—For ease of comparison, blanks (........) appear in the above table where blanks appear in previously mentioned tables in U.S. Patent 2,581,376.

Oxypropylated derivatives comparable to 1b through 80b as described above can readily be obtained by substituting a molar equivalent amount of propylene oxide, i.e., 56 lbs. of propylene oxide, for example, for each 44 lbs. of ethylene oxide. We have prepared such a familiar series but for sake of brevity only a few will be included for purposes of illustration.

TABLE V

| Ex. No. | Oxypropylated analog | Phenol | Aldehyde | Solvent, lbs. | Resin, lbs. | Propylene oxide, lbs. |
|---|---|---|---|---|---|---|
| 1c | 1b | Para-tertiary amyl | Formaldehyde | 14.25 | 15.75 | 5.10 |
| 2c | 2b | ----do---- | ----do---- | 10.90 | 12.10 | 19.40 |
| 3c | 3b | ----do---- | ----do---- | 7.13 | 7.93 | 25.30 |
| 4c | 4b | ----do---- | ----do---- | 3.84 | 4.25 | 23.00 |
| 5c | 5b | ----do---- | ----do---- | 1.80 | 2.04 | 13.00 |
| 66c | 66b | Para-octyl | Propionaldehyde | 13.30 | 16.90 | 3.82 |
| 67c | 67b | ----do---- | ----do---- | 10.20 | 12.90 | 14.40 |
| 68c | 68b | ----do---- | ----do---- | 6.46 | 8.24 | 21.00 |
| 69c | 69b | ----do---- | ----do---- | 3.86 | 4.87 | 16.60 |
| 70c | 70b | ----do---- | ----do---- | 2.94 | 3.75 | 16.80 |
| 76c | 76b | Para-tertiary amyl | Formaldehyde | 12.60 | 16.20 | 4.46 |
| 77c | 77b | ----do---- | ----do---- | 9.52 | 12.24 | 16.45 |
| 78c | 78b | ----do---- | ----do---- | 6.50 | 8.30 | 22.60 |
| 79c | 79b | ----do---- | ----do---- | 4.25 | 5.45 | 22.00 |
| 80c | 80b | ----do---- | ----do---- | 2.69 | 3.43 | 18.55 |

As an illustration of oxypropylated resins involving the use of both ethylene and propylene oxide, a reference is made to the aforementioned U.S. Patent 2,557,081, dated June 19, 1951, to De Groote and Keiser. The last table in column 28 of said patent describes in detail the preparation of a series of oxyalkylated resins in which both propylene and ethylene oxide are employed. Simply by illustration, a series of 27 compounds are included, the description of which appears in detail in said aforementioned U.S. Patent 2,577,081, to De Groote and Keiser.

Note the first series of nine compounds, 1d through 9d were prepared with propylene oxide, first and then ethylene oxide. The second nine compounds, 10d through 18d inclusive, were prepared using ethylene oxide first and then propylene oxide, and the last nine compounds, 19d through 27d, were prepared by random oxyalkylation, i.e., using a mixture of the two oxides.

In the preparation of the resins, our preference is to use hydrocarbon substituted phenols, particularly para-substituted, in which the substituted radical R contains 4 to 18 carbon atoms and particularly 4 to 14 carbon atoms. The amount of alkylene oxide introduced may be comparatively large in comparison to the initial resin. For instance, there may be as much as 50 parts by weight of an oxide or mixed oxides used for each part by weight of resin employed.

It will be noted that the various resins referred to in the aforementioned U.S. Patent 2,499,370 are substantially the same type of materials as referred to in Table III. For instance, resin 3aa of the table is substantially the same as 2a of the patent; resin 20aa of the table is substantially the same as 34aa of the patent; and resin 38aa of the table is the same as 3a of the patent.

In reaction with polyepoxides, and particularly diepoxides, a large number of the previously described oxyalkylated resins have been employed. For convenience, the list (Table VII) is selected indicating the previously described compounds and their molecular weight. Such resins are generally employed as a 50% solution and the polyepoxide employed is a 50% solution, usually both reactants being dissolved in xylene and sufficient sodium methylate added to act as a catalyst, for instance, 1 to 2%.

TABLE VI

| Ex. No. | See U. S. Pat. 2,557,081 | | Resin used | Resin, lbs. | Ethylene oxide, lbs. | Propylene oxide, lbs. | Weight of xylene | Flake caustic soda, ounces |
|---|---|---|---|---|---|---|---|---|
| | Ex. No. in above patent | Point on graph on above patent | | | | | | |
| 1d | A | 1 | Tert. amylphenol formaldehyde | 6 | 3 | 1 | 10 | 1 |
| 2d | B | 5 | ----do---- | 5 | 4 | 1 | 10 | 1 |
| 3d | C | 8 | ----do---- | 3 | 6 | 1 | 10 | 1 |
| 4d | D | 2 | ----do---- | 1 | 21.5 | 2.5 | 25 | 2 |
| 5d | E | 9 | ----do---- | 1 | 15 | 9 | 25 | 2 |
| 6d | F | 6 | ----do---- | 1 | 10 | 15 | 25 | 2 |
| 7d | G | 3 | ----do---- | 1 | 2.5 | 21.5 | 25 | 2 |
| 8d | H | 7 | ----do---- | 5 | 1 | 4 | 10 | 1 |
| 9d | I | 4 | ----do---- | 6 | 1 | 3 | 10 | 1 |
| 10d | A | 1 | Tert. butylphenol formaldehyde | 6 | 3 | 1 | 10 | 1 |
| 11d | B | 5 | ----do---- | 5 | 4 | 1 | 10 | 1 |
| 12d | C | 8 | ----do---- | 3 | 6 | 1 | 10 | 1 |
| 13d | D | 2 | ----do---- | 1 | 21.5 | 2.5 | 25 | 2 |
| 14d | E | 9 | ----do---- | 1 | 15 | 9 | 25 | 2 |
| 15d | F | 6 | ----do---- | 1 | 10 | 14 | 25 | 2 |
| 16d | G | 3 | ----do---- | 1 | 2.5 | 21.5 | 25 | 2 |
| 17d | H | 7 | ----do---- | 5 | 1 | 4 | 10 | 1 |
| 18d | I | 4 | ----do---- | 6 | 1 | 3 | 10 | 1 |
| 19d | A | 1 | Nonylphenol-formaldehyde | 6 | 3 | 1 | 10 | 1 |
| 20d | B | 5 | ----do---- | 5 | 4 | 1 | 10 | 1 |
| 21d | C | 8 | ----do---- | 3 | 6 | 1 | 10 | 1 |
| 22d | D | 2 | ----do---- | 1 | 21.5 | 2.5 | 25 | 2 |
| 23d | E | 9 | ----do---- | 1 | 15 | 9 | 25 | 2 |
| 24d | F | 6 | ----do---- | 1 | 10 | 14 | 25 | 2 |
| 25d | G | 3 | ----do---- | 1 | 2.5 | 21.5 | 25 | 2 |
| 26d | H | 7 | ----do---- | 5 | 1 | 4 | 10 | 1 |
| 27d | I | 4 | ----do---- | 6 | 1 | 3 | 10 | 1 |

TABLE VII

| Example No. | Molecular weight |
|---|---|
| 1bb | 1,202 |
| 2bb | 2,169 |
| 3bb | 3,339 |
| 4bb | 4,609 |
| 5bb | 5,749 |
| 6bb | 1,509 |
| 7bb | 2,466 |
| 8bb | 3,657 |
| 9bb | 5,867 |
| 10bb | 6,087 |
| 1c | 1,270 |
| 2c | 2,494 |
| 3c | 4,019 |
| 4c | 6,139 |
| 5c | 7,079 |
| 1d | 1,697 |
| 2d | 1,918 |
| 3d | 3,189 |
| 4d | 23,959 |
| 5d | 23,959 |
| 6d | 24,909 |
| 7d | 23,959 |
| 8d | 1,918 |
| 9d | 1,697 |

PART 5

As previously stated, the final stage reactions involve two moles of an oxyalkylated phenol-aldehyde resin of the kind previously described and one mole of a diglycidyl ether as specified. The reaction is essentially an oxyalkylation reaction and thus may be considered as merely a continuance of the previous oxyalkylation reaction involving a monoepoxide as differentiated from a polyepoxide and particularly a diepoxide. The reactions take place in substantially the same way, i.e., by the opportunity to react at somewhere above the boiling point of water and below the point of decomposition, for example, 130–185° C. in the presence of a small amount of alkaline catalyst. Since the polyepoxide is non-volatile as compared, for example, with ethylene oxide, the reaction is comparatively simple. Purely from a mechanical standpoint is a matter of convenience to conduct both classes of reactions in the same equipment. In other words, after the phenol-aldehyde resin has been reacted with ethylene oxide, propylene oxide or the like, it is subsequently reacted with a polyexopide. The polyepoxide reaction can be conducted in an ordinary reaction vessel such as the usual glass laboratory equipment. This is particularly true of the kind used for resin manufacture as described in a number of patents, as for example, U.S. Patent No. 2,429,365. One can use a variety of catalysts in connection with the polyepoxide of the same class employed with monoepoxide. In fact, the reaction will go at an extremely slow rate without any catalyst at all. The usual catalyst include alkaline materials such as caustic soda, caustic potash, sodium methylate, etc. Other catalysts may be acidic in nature and are of the kind characterized by iron and tin chlorides. Furthermore, insoluble catalysts such as clays or specially prepared mineral catalysts have been used. For practical purposes, it is best to use the same catalyst as is used in the initial oxyalkylation step and in many cases there is sufficient residual catalyst to serve for the reaction involving the second oxyalkylation step, i.e., the polyepoxide. For this reason, we have preferred to use a small amount of finely divided caustic soda or sodium methylate as the initial catalyst and also the catalyst in the second stage. The amount generally employed is 1, 2 or 3% of these alkaline catalysts.

Actually, the reactions of polyepoxides with various resin materials have been thoroughly described in the literature and the procedure is, for all purposes, the same as with glycide which has been described previously.

It goes without saying that the reaction involving the polyepoxide can be conducted in the same manner as the monoepoxide as far as the presence of an inert solvent is concerned, i.e., one that is not oxyalkylation-susceptible. Generally speaking, this is most conveniently an aromatic solvent such as xylene or a higher boiling coal tar solvent, or else a similar high boiling aromatic solvent obtained from petroleum. One can employ an oxygenated solvent such as the diethylether of ethylene glycol, or the diethylether of propylene glycol, or similar ethers, either alone or in combination with a hydrocarbon solvent. The solvent so selected should be one which, of course, is suitable in the oxyalkylation step involving the monoepoxides described subsequently. The solvent selected may depend on the ability to remove it by subsequent distillation if required. Here again it has been our preference to have a solvent present in the oxyalkylation involving the initial stage and permitting the solvent to remain. The amount of solvent may be insignificant, depending whether or not exhaustive oxypropylation is of course, by use of charcoal, filtering earths, or the like.

Various examples obtained in substantially the same manner as employed are described in the following tables:

TABLE VIII

| Ex. No. | Oxyalkylated resin | Amt., gms. | Diepoxide used | Amt., grams | Catalyst (NaOCH₃), grams | Xylene, gms. | Molar ratio | Time of reaction, hrs. | Max. temp., °C. | Color and physical state |
|---|---|---|---|---|---|---|---|---|---|---|
| 1e | 2bb | 217 | 1b | 65.6 | 1.4 | 282.6 | 2:1 | 3 | 160 | Dark viscous mass. |
| 2e | 4bb | 460 | 4b | 25.6 | 2.4 | 485.6 | 2:1 | 3 | 155 | Do. |
| 3e | 7bb | 247 | 5b | 43.0 | 1.5 | 290.0 | 2:1 | 3 | 158 | Do. |
| 4e | 10bb | 609 | 6b | 55.0 | 3.3 | 664.0 | 2:1 | 3 | 160 | Do. |
| 5e | 2c | 429 | 7b | 105.5 | 2.7 | 534.5 | 2:1 | 3 | 150 | Do. |
| 6e | 3c | 402 | 8b | 19.5 | 2.1 | 421.5 | 2:1 | 3 | 154 | Do. |
| 7e | 5c | 708 | 9b | 23.5 | 3.7 | 731.5 | 2:1 | 3 | 158 | Do. |
| 8e | 2d | 192 | 10b | 28.0 | 1.1 | 220.0 | 2:1 | 3 | 156 | Do. |
| 9e | 3d | 319 | 11b | 32.5 | 1.8 | 351.5 | 2:1 | 3 | 160 | Do. |
| 10e | 6d | 249 | 12b | 36.5 | 1.4 | 235.5 | 2:1 | 3 | 160 | Do. | employed. However, since the oxypropylated phenol-aldehyde resins are almost invariably liquids there is no need for the presence of a solvent as when oxyalkylation involves a solid which may be rather high melting. Thus, it is immaterial whether there is solvent present or not and it is immaterial whether solvent was added in the first stage of oxyalkylation or not, and also it is immaterial whether there was solvent present in the second stage of oxyalkylation or not. The advantage of the presence of solvent is that sometimes it is a convenient way of controlling the reaction temperature and thus in the subsequent examples we have added sufficient xylene so as to produce a mixture which boils somewhere in the neighborhood of 125° to 140° C. and removes xylene so as to bring the boiling point of the mixture to about 140° C. during part of the reaction and subsequently removing more xylene so that the mixture refluxed at somewhere between 170° to 190° C. This was purely a convenience and need not be employed unless desired.

*Example 1e*

The oxyalkylated resin employed was the one previously identified as 2bb, having a molecular weight of 2169; the amount employed was 217 grams. The resin was dissolved in approximately an equal weight of xylene. The mixture was heated to just short of the boiling point of water, i.e., a little below 100° C. Approximately one-half percent of sodium methylate was added, or, more exactly, 1.4 grams. The stirring was continued until there was a solution or distribution of the catalyst. The mixture was heated to a little past 100° C. and left at this temperature while 65.6 grams of the diepoxide (previously identified as 1b), dissolved in an equal weight of xylene, were added. After the diepoxide was added the temperature was permitted to rise to approximately 110° C. The time required to add the diepoxide was approximately 45 minutes. The temperature hose in this period to about 130° C. The temperature rise was controlled by allowing the xylene to reflux over and to separate out the xylene by a phase-separating trap. In any event, the temperature was raised shortly to 160° C. and allowed to reflux at this temperature for almost three hours. Tests indicated that the reaction was complete at the end of this time; in fact, it probably was complete at a considerably earlier stage. The xylene which had been separated out was returned to the mixture so that the reaction mass at the end of the procedure represented about 50% reaction product and 50% solvent. The procedure employed is, of course, simple in light of what has been said previously; in fact, it corresponds to the usual procedure employed in connection with an oxyalkylating agent such as glycide, i.e., a non-volatile oxyalkylating agent. At the end of the reaction period the mass obtained was a dark, viscous mixture. It could be bleached,

TABLE IX

| Ex. No. | Oxyalkylated resin used | Probable molecular wt. of reaction product | Amount of product, grams | Amount of solvent, grams |
|---|---|---|---|---|
| 1e | 2bb | 5,650 | 5,660 | 2,825 |
| 2e | 4bb | 9,700 | 4,850 | 2,425 |
| 3e | 7bb | 5,800 | 5,800 | 2,900 |
| 4e | 10bb | 13,300 | 6,650 | 3,325 |
| 5e | 2c | 10,700 | 5,350 | 2,675 |
| 6e | 3c | 8,430 | 8,430 | 4,215 |
| 7e | 5c | 14,640 | 7,320 | 3,660 |
| 8e | 2d | 4,400 | 4,400 | 2,200 |
| 9e | 3d | 7,030 | 7,030 | 3,515 |
| 10e | 6d | 5,710 | 5,715 | 2,858 |

PART 6

As to the use of conventional demulsifying agents reference is made to U.S. Patent No. 2,626,929, dated January 7, 1953, to De Groote, and particularly to Part 3. Everything that appears therein applies with equal force and effect to the instant process, noting only that where reference is made to Example 13b in said text beginning in column 15 and ending in column 18, reference should be to Example 4e, herein described.

PART 7

The polyepoxide converted oxyalkylated products obtained in the manner described in Part 4 can be subjected to reaction with a variety of reactants such as the alkylene imines, butylene, ethylene and propylene imine, to produce cation-active materials. Instead of an imine, one may employ what is a somewhat equivalent material, to wit, a dialkylamino-epoxypropane of the structure

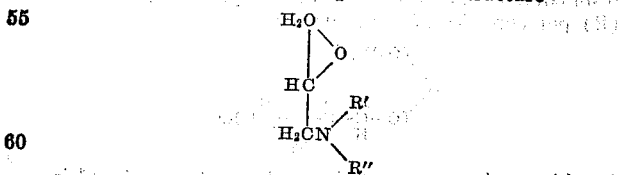

wherein R' and R" are alkyl groups.

It is not necessary to point out that after a reaction with a reactant of the kind described which introduces a basic nitrogen atom the resultant product can be converted into a cation-active material suitable for a variety of purposes in which such compounds are conventionally employed.

Referring now to the polyepoxide derived oxyalkylated products described in Part 5 preceding, it is to be noted that in addition to their use in the resolution of petroleum emulsions they may be used as emulsifying agents for oils, fats, and waxes, as ingredients in insecticide compositions, or as detergents and wetting agents in the laundering, scouring, dyeing, tanning and mordanting industries. They may also be used for preparing boring or metal-cutting oils and cattle dips, as metal pickling inhibitors, and for pharmaceutical purposes.

Not only do these oxyalkylated derivatives have their utility as such but they can serve as initial materials for more complicated reactions of the kind ordinarily requiring a hydroxyl radical. This includes esterification, etherization, etc.

The oxyalkylated derivatives may be used as valuable additives to lubricating oils, both those derived from petroleum and synthetic lubricating oils. Also, they can be used as additives to hydraulic brake fluids of the aqueous and non-aqueous types. They may be used in connection with other processes where they are injected into an oil or gas well for purpose of removing a mud sheath, increasing the ultimate flow of fluid from the surrounding strata, and particularly in secondary recovery operations using aqueous flood waters. These derivatives also are suitable for use in dry cleaners' soaps.

Comparable compounds which can serve the various purposes previously enumerated, in both the resinous stage and the oxyalkylated stage, are obtained from another class of resins, i.e., those in which the phenolic nuclei are separated by a radical having at least a 3-carbon atom chain and are obtained, not by the use of a single aldehyde but by the use of formaldehyde, in combination with a carbonyl compound selected from the class of aldehydes and ketones in which there is an alpha hydrogen atom available as in the case of acetaldehyde or acetone. Such resins almost invariably involve the use of a basic catalyst. Such bridge radicals between phenolic nuclei have either hydroxyl radicals or carbonyl radicals, or both, and are invariably oxyalkylation-susceptible and may also enter into more complicated reactants with basic secondary amines. The bridge radical in the initial resin has distinct hydrophile character. Such resins or compounds which can be converted readily into such resins are described in the following patents. Such analogous compounds are not included as part of the instant invention.

| U.S. Patent No. | Dated | Inventor |
| --- | --- | --- |
| 2,191,802 | Feb. 27, 1940 | Novotny et al. |
| 2,448,664 | Sept. 27, 1948 | Fife et al. |
| 2,538,883 | Jan. 23, 1951 | Schrimpe. |
| 2,538,884 | ----do---- | Do. |
| 2,545,559 | Mar. 20, 1951 | Do. |
| 2,570,389 | Oct. 9, 1951 | Do. |

Having thus described our invention, what we claim as new and desire to secure by Letters Patent, is:

1. Synthetic hydrophile products; said synthetic hydrophile products being the reaction products obtained by condensing (A) an oxyalkylated phenol-aldehyde resin containing a plurality of active hydrogen atoms, and (B) polyepoxides of the structure

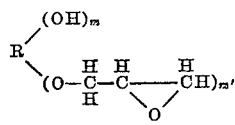

in which $m$ is a small whole number not over 4 and including 0, and $m'$ is a small whole number varying from 2 to 4, and R is the unmodified residual radical of the intermediate polyol

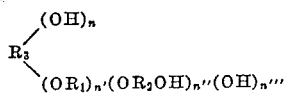

in which $n$ is a small whole number varying from 0 to 2, $OR_1$ is selected from the class consisting of oxyethylene radicals, oxypropylene radicals, and oxybutylene radicals; $OR_2OH$ is selected from the class consisting of oxy(hydroxy)propylene radicals and oxy(hydroxy)butylene radicals; $n'$ is a numeral varying from 2 to 200; $n''$ is a numeral varying from 0 to 8 and $n'''$ is a numeral varying from 2 to 4; with the proviso that the sum of $n$ and $n'''$ is not over 4; with the proviso that the radical $R_3$ be free from any radical having at least 5 uninterrupted carbon atoms and consist essentially of a polyoxyalkylene chain containing sufficient alkylene groups having 3 and 4 carbon atoms to impart water insolubility and hydrophobe solvent solubility to the initial precusory polyol $R_3(OH)_{n4}$ in which $n_4$ is a small whole number varying from 2 to 4; said oxyalkylated phenol-aldehyde resins, reactant (A) being the products derived by oxyalkylation involving ($aa$) an alpha-beta alkylene oxide having not more than 4 carbon atoms and selected from the class consisting of ethylene oxide, propylene oxide, butylene oxide, glycide, and methylglycide, and ($bb$) a fusible, organic solvent-soluble, water-insoluble phenol-aldehyde resin; said resin being derived by reaction between a difunctional monohydric phenol and an aldehyde having not over 8 carbon atoms and reactive toward said phenol; said resin being formed in the substantial absence of trifunctional phenols; said phenol being of the formula

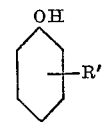

in which R' is selected from the class consisting of phenyl and saturated hydrocarbon radicals having not more than 24 carbon atoms and substituted in the 2,4,6 position; said oxyalkylated resin being characterized by the introduction into the resin molecule of a plurality of divalent radicals having the formula $(R_4O)_{n_1}$, in which $R_4$ is a member selected from the class consisting of ethylene radicals, propylene radicals, hydroxypropylene radicals, and hydroxybutylene radicals, and $n_1$ is a numeral varying from 1 to 120; with the proviso that at least 2 moles of alkylene oxide be introduced for each phenolic nucleus, and that the resin by weight represent at least 2% of the oxyalkylated derivative; the ratio of reactant (A) to reactant (B) being in the proportion of two moles of (A) to one mole of (B); with the further proviso that said reactive compounds (A) and (B) be members of the class consisting of non-thermosetting organic solvent-soluble liquids and low-melting solids; with the final proviso that the reaction product be a member of the class of solvent-soluble liquids and low-melting solids; and said reaction between (A) and (B) being conducted below the pyrolytic point of the reactants and the resultants of reaction.

2. Synthetic hydrophile products; said synthetic hydrophile products being the reaction products obtained by condensing (A) an oxyalkylated phenol-aldehyde resin containing a plurality of active hydrogen atoms, and (B) polyepoxides of the structure

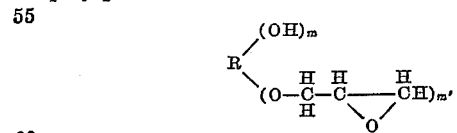

in which $m$ is a small whole number not over 4 and including 0, and $m'$ is a small whole number varying from 2 to 4, and R is the unmodified residual radical of the intermediate polyol

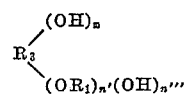

in which $n$ is a small whole number varying from 0 to 2, $OR_1$ is selected from the class consisting of oxyethylene radicals, oxypropylene radicals, and oxybutylene radicals; $n'$ is a numeral varying from 2 to 200; and $n'''$ is a numeral varying from 0 to 4; with the proviso that the sum of $n$ and $n'''$ is not over 4; with the proviso that the radical $R_3$ be free from any radical having at least 5 uninterrupted carbon atoms and consist essentially of a polyoxyalkylene chain containing sufficient alkylene groups having 3 and 4 carbon atoms to impart water insolubility and hydrophobe solvent solubility to the initial precursory polyol $R_3(OH)_{n_4}$ in which $n_4$ is a small whole number varying from 2 to 4; said polyepoxides being characterized by having present not more than 20 carbon atoms; said oxyalkylated phenolaldehyde resins, reactant (A) being the products derived by oxyalkylation involving (aa) an alpha-beta alkylene oxide having not more than 4 carbon atoms and selected from the class consisting of ethylene oxide, propylene oxide, butylene oxide, glycide, and methylglycide, and (bb) a fusible, organic solvent-soluble, water-insoluble phenol-aldehyde resin; said resin being derived by reaction between a difunctional monohydric phenol and an aldehyde having not over 8 carbon atoms and reactive toward said phenol; said resin being formed in the substantial absence of trifunctional phenols; said phenol being of the formula

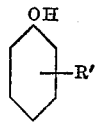

in which R' is selected from the class consisting of phenyl and saturated hydrocarbon radicals having not more than 24 carbon atoms and substituted in the 2,4,6 position; said oxyalkylated resin being characterized by the introduction into the resin molecule of a plurality of divalent radicals having the formula $(R_4O)_{n_1}$, in which $R_4$ is a member selected from the class consisting of ethylene radicals, propylene radicals, hydroxypropylene radicals, and hydroxybutylene radicals, and $n_1$ is a numeral varying from 1 to 120; with the proviso that at least 2 moles of alkylene oxide be introduced for each phenolic nucleus, and that the resin by weight represent at least 2% of the oxyalkylated derivative; the ratio of reactant (A) to reactant (B) being in the proportion of two moles of (A) to one mole of (B); with the further proviso that said reactive compounds (A) and (B) be members of the class consisting of non-thermosetting organic solvent-soluble liquids and low-melting solids; with the final proviso that the reaction product be a member of the class of solvent-soluble liquids and low-melting solids; and said reaction between (A) and (B) being conducted below the pyrolytic point of the reactants and the resultants of reaction.

3. Synthetic hydrophile products; said synthetic hydrophile products being the reaction products obtained by condensing (A) an oxyalkylated phenol-aldehyde resin containing a plurality of active hydrogen atoms, and (B) polyepoxides of the structure

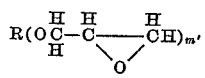

in which $m'$ is a small whole number varying from 2 to 4, and R is the unmodified residual radical of the intermediate polyol

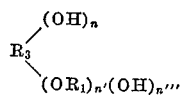

in which $n$ is a small whole number varying from 0 to 2, $OR_1$ is selected from the class consisting of oxyethylene radicals, oxypropylene radicals, and oxybutylene radicals; $n'$ is a numeral varying from 2 to 200; and $n'''$ is a numeral varying from 2 to 4; with the proviso that the sum of $n$ and $n'''$ is not over 4; with the proviso that the radical $R_3$ be free from any radical having at least 5 uninterrupted carbon atoms and consist essentially of a polyoxyalkylene chain containing sufficient alkylene groups having 3 and 4 carbon atoms to impart water insolubility and hydrophobe solvent solubility to the initial precursory polyol $R_3(OH)_{n_4}$ in which $n_4$ is a small whole number varying from 2 to 4; said oxyalkylated phenol-aldehyde resins, reactant (A) being the products derived by oxyalkylation involving (aa) an alpha-beta alkylene oxide having not more than 4 carbon atoms and selected from the class consisting of ethylene oxide, propylene oxide, butylene oxide, glycide, and methylglycide, and (bb) a fusible, organic solvent-soluble, water-insoluble, phenol-aldehyde resin; said resin being derived by reaction between a difunctional monohydric phenol and an aldehyde having not over 8 carbon atoms and reactive toward said phenol; said resin being formed in the substantial absence of trifunctional phenols; said phenol being of the formula

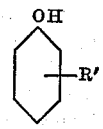

in which R' is selected from the class consisting of phenyl and saturated hydrocarbon radicals having not more than 24 carbon atoms and substituted in the 2,4,6 position; said oxyalkylated resin being characterized by the introduction into the resin molecule of a plurality of divalent radicals having the formula $(R_4O)_{n_1}$, in which $R_4$ is a member selected from the class consisting of ethylene radicals, propylene radicals, hydroxypropylene radicals, and hydroxybutylene radicals, and $n_1$ is a numeral varying from 1 to 120; with the proviso that at least 2 moles of alkylene oxide be introduced for each phenolic nucleus, and that the resin by weight represent at least 2% of the oxyalkylated derivative; the ratio of reactant (A) to reactant (B) being in the proportion of two moles of (A) to one mole of (B); with the furher proviso that said reactive compounds (A) and (B) be members of the class consisting of non-thermosetting organic solvent-soluble liquids and low-melting solids; with the final proviso that the reaction product be a member of the class of solvent-soluble liquids and low-melting solids; and said reaction between (A) and (B) being conducted below the pyrolytic point of the reactants and the resultants of reaction.

4. Synthetic hydrophile products; said synthetic hydrophile products being the reaction products obtained by condensing (A) an oxyalkylated phenol-aldehyde resin containing a plurality of active hydrogen atoms, and (B) diepoxides of the structure

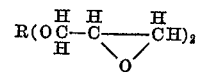

in which R is the unmodified residual radical of the intermediate diol $$R_3[(OR_1)_{n'}OH]_2$$

in which $OR_1$ is selected from the class consisting of oxyethylene radicals, oxypropylene radicals, and oxybutylene radicals; with the proviso that $n'$ is a numeral varying from 100 to 200, and with the proviso that the radical $R_3$ be free from any radical having at least 5 uninterrupted carbon atoms and consist essentially of a polyoxyalkylene chain containing sufficient alkylene groups having 3 and 4 carbon atoms to impart water insolubility and hydrophobe solvent solubility to the initial precursory diol $R_3(OH)_2$; said oxyalkylated phenol-aldehyde resins, reactant (A) being the products derived by oxyalkylation involving (aa) an alpha-beta alkylene oxide having not more than 4 carbon atoms and selected from the class consisting of ethylene oxide, propylene oxide, butylene oxide, glycide, and methylglycide, and (bb) a fusible, organic solvent-soluble, water-insoluble phenol-aldehyde resin; said resin being derived by reaction between a difunctional monohydric phenol and an aldehyde having not over 8 carbon atoms and reactive toward said phenol; said resin being formed in the substantial absence of trifunctional phenols; said phenol being of the formula

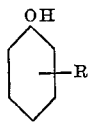

in which R is selected from the class consisting of phenyl and saturated hydrocarbon radicals having not more than 24 carbon atoms and substituted in the 2,4,6 position; said oxyalkylated resin being characterized by the introduction into the resin molecule of a plurality of divalent radicals having the formula $(R_4O)_{n_1}$ in which $R_4$ is a member selected from the class consisting of ethylene radicals, and hydroxybutylene radicals, and $n_1$ is a numeral varying from 1 to 120; with the proviso that at least 2 moles of alkylene oxide be introduced for each phenolic nucleus, and that the resin by weight represent at least 2% of the oxyalkylated derivative; the ratio of reactant (A) to reactant (B) being in the proportion of two moles of (A) to one mole of (B); with the further proviso that said reactive compounds (A) and (B) be members of the class consisting of non-thermosetting organic solvent-soluble liquids and low-melting solids; with the final proviso that the reaction product be a member of the class of solvent-soluble liquids and low-melting solids; and said reaction between (A) and (B) being conducted below the pyrolytic point of the reactants and the resultants of reaction.

5. The product of claim 4 with the proviso that the majority of the occurrences of $OR_1$ are oxypropylene radicals and that R" has at least 4 and not over 14 carbon atoms and is substituted in the para position and the aldehyde is formaldehyde, and with the further proviso that the original resin has not over 6 phenolic nuclei.

References Cited in the file of this patent

UNITED STATES PATENTS

| | | |
|---|---|---|
| 2,521,912 | Greenlee | Sept. 12, 1950 |
| 2,626,942 | De Groote | Jan. 27, 1953 |